(12) United States Patent
Howe et al.

(10) Patent No.: US 8,904,407 B2
(45) Date of Patent: Dec. 2, 2014

(54) ASYNCHRONOUSLY REFRESHING, NETWORKED APPLICATION WITH SINGLE-THREADED USER INTERFACE

(75) Inventors: Anthony Howe, Kirkland, WA (US); Mark D'Urso, Redmond, WA (US); Chris Mullins, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 33 days.

(21) Appl. No.: 13/193,598

(22) Filed: Jul. 28, 2011

(65) Prior Publication Data

US 2013/0031564 A1    Jan. 31, 2013

(51) Int. Cl.
   *G06F 9/46*    (2006.01)
   *G06F 9/54*    (2006.01)
   *G06F 17/30*    (2006.01)
   *G06F 9/44*    (2006.01)

(52) U.S. Cl.
   CPC ............ *G06F 9/54* (2013.01); *G06F 2209/541* (2013.01); *G06F 9/46* (2013.01); *G06F 17/3089* (2013.01); *G06F 9/4443* (2013.01)
   USPC ...................................................... 718/106

(58) Field of Classification Search
   None
   See application file for complete search history.

(56) References Cited

U.S. PATENT DOCUMENTS

| | | | |
|---|---|---|---|
| 6,772,216 B1 * | 8/2004 | Ankireddipally et al. .... | 709/230 |
| 7,165,252 B1 | 1/2007 | Xu | |
| 7,207,042 B2 | 4/2007 | Smith et al. | |
| 7,376,952 B2 | 5/2008 | Katti et al. | |
| 7,487,201 B1 * | 2/2009 | Murray et al. ................ | 709/201 |
| 8,307,031 B1 * | 11/2012 | Grieve ........................... | 709/203 |
| 2007/0299928 A1 * | 12/2007 | Kohli et al. .................... | 709/217 |
| 2008/0005737 A1 | 1/2008 | Saha et al. | |
| 2008/0082936 A1 * | 4/2008 | Helvick ......................... | 715/779 |
| 2011/0126210 A1 * | 5/2011 | Rivard et al. .................. | 718/108 |
| 2011/0202847 A1 * | 8/2011 | Dimitrov ....................... | 715/738 |

OTHER PUBLICATIONS

Jesse James Garret, 2005, Ajax: A New Approach to Web Applications. http://www.adaptivepath.com/publications/essays/archives/0 00385.php (attached to the instant office action as Garrett_AjaxWebApplications.pdf).*

"Improving ASP.NET Performance", http://msdn.microsoft.com/en-us/library/ff647787.aspx, accessed May 11, 2011, 59 pages.

(Continued)

*Primary Examiner* — Jung Kim
*Assistant Examiner* — Janusz Kusyk
(74) *Attorney, Agent, or Firm* — Jim Sfekas; Kate Drakos; Micky Minhas

(57) ABSTRACT

An invention is disclosed for updating a networked, single-threaded application's data model without blocking the application's entire user interface. In embodiments of the invention, a client executes a networked application with a single-threaded user interface that communicates with a server to refresh its data model. The client sends a message to the server that requests a refresh of the data model. Before the data model has been refreshed, the client receives local user input to perform an action on the data model. The client sends a message to the server to cancel the refresh. When the client receives an acknowledgement from the server that the refresh has been cancelled, the client performs the action. After performing the action, the client sends a second message to the server that requests a refresh of the data model, and then refreshes the data model upon receiving the refreshed data model from the server.

20 Claims, 8 Drawing Sheets

(56) References Cited

OTHER PUBLICATIONS

Johnson et al., "Interrupt Modeling for Efficient High-level Scheduler Design Space Exploration", ACM, Transactions on Design Automation of Electronic Systems, Jan. 2008, 13 (1), 10, 10:1-10:22.

O'Ryan et al., "Applying a Scalable CORBA Events Service to Large-scale Distributed Interactive Simulations", In Proceedings of the 5th Workshop on Object-Oriented Real-Time Dependable Systems, Nov. 1999, 1-13.

Parmer et al., "Predictable Interrupt Management and Scheduling in the Composite Component-based System", Computer Science Department, Boston University, Dec. 2, 2008, 35 pages.

Pham et al., "A Dynamic Platform for Runtime Adaptation", IEEE International Conference on Pervasive Computing and Communications, 2009, 10 pages.

Sergent et al., "Impact of a Failure Detection Mechanism on the Performance of Consensus", Proceedings 8th Pacific Rim International Symposium on Dependable Computing(PRDC), 2001, 9 pages.

* cited by examiner

| 206 Hosted Servers | Name 214 | Type 216 | Status 218 |
|---|---|---|---|
| 208 Storage Accounts | | | |
| 210 User Management | jdoe1 | Hosted Service | Created |
| | jdoe2 | Hosted Service | Created |
| 212 VM Images | jdoe | Hosted Service | Created |

| 206<br>Hosted Servers | Name | Access Role | Subscription ID |
|---|---|---|---|
| 208<br>Storage Accounts | | | |
| 210<br>User Management | jdoe@127.0.0.1<br>John's Dev. Acct.<br><br>jdoe1@127.0.0.1<br>John's Dev. Acct.<br>Azure | Service Admin.<br><br><br>Co-Admin.<br>Service Admin. | ee329bc2ced5282<br><br><br>fd19cb71be05ab92<br>cad673b2dcbf0cd5 |
| 212<br>VM Images | | | |
| | Started | URL | |
| | 00:00.000<br>+6.257 | http://127.0.0.1<br>http://127.0.0.1/test.html | |

ASYNCHRONOUSLY REFRESHING, NETWORKED APPLICATION WITH SINGLE-THREADED USER INTERFACE

BACKGROUND

There are asynchronously refreshing, networked applications where data is periodically refreshed across a network for display on a computer that executes such an application. An application may be considered to asynchronously refresh when the time for the refresh is not pre-arranged between the application and a server from which the application refreshes data. Where the networked application has a multi-threaded user interface (a thread being a line of execution within an application or process that maintains state information as to its execution and shares memory and other resources with other threads of the application), there may be one thread of the application that refreshes data, and another thread of the application that receives user input locally. The data-refresh thread and the user-input thread may then share a mutex or semaphore so that they do not conflict—so that data integrity is not compromised where a user-initiated event concurrently modifies the data model during the mutating part of the refresh action.

Where the asynchronously refreshing, networked application has only a single thread of execution, there are also techniques for refreshing data across a network. One technique involves synchronously blocking the entire user interface of the single-threaded application while updating the application's data model (a data model is a structured arrangement of data for storage and/or presentation). However, there are many problems with refreshing the data model of a single-threaded, rich networked application, some of which are well known.

SUMMARY

It would be an improvement over the prior art to allow for updating the data model of an asynchronously refreshing, networked, application with a single-threaded user interface without blocking the application's entire user interface. Updating the data model without blocking the application's entire user interface is an improvement because doing so increases the responsiveness of the application, which improves user experience.

In embodiments of the invention, a client executes an asynchronously refreshing, networked application with a single-threaded user interface that communicates with a server to refresh its data model. Examples of asynchronously refreshing, networked applications with a single-threaded user interface include versions of MICROSOFT SILVERLIGHT, ADOBE FLASH, MICROSOFT WINDOWS 7 PHONE and HTML5/JAVASCRIPT. The client sends a message to the server that requests a refresh of the data model. Before the data model has been refreshed, the client receives local user input to perform an action on the data model (a mutating action initiated by the user that will cause a modification of the data model). The client then sends a message to the server to cancel the refresh and pauses a client-side mechanism to periodically send refresh requests. When the client receives an acknowledgement from the server that the refresh has been cancelled, the client then performs the action that modifies the data model, and sends an indication of the updated data model to the server. After performing the action, the client sends a second message to the server that requests a refresh of the data model, and then refreshes the data model upon receiving the refreshed data model from the server. Through these operations, the client is able to more quickly carry out user actions on the data model than in a scenario where the user interface is blocked during a refresh. By more quickly carrying out user actions, the time between when a user attempts to perform an action and when that action is performed by the client is shortened, which improves user experience.

Other embodiments of the invention are described below with respect to the illustrative embodiments.

BRIEF DESCRIPTION OF THE ILLUSTRATIVE EMBODIMENTS

The systems, methods, and computer-readable media for an improved networked application with a single-threaded user interface are further described with reference to the accompanying illustrative embodiments in which:

FIG. 2 depicts an example user interface for an asynchronously refreshing, networked application with a single-threaded user interface for which embodiments of the invention are implemented.

FIG. 4 depicts a third example user interface for an asynchronously refreshing, networked application with a single-threaded user interface for which embodiments of the invention are implemented.

DETAILED DESCRIPTION OF ILLUSTRATIVE EMBODIMENTS

Figure 1:
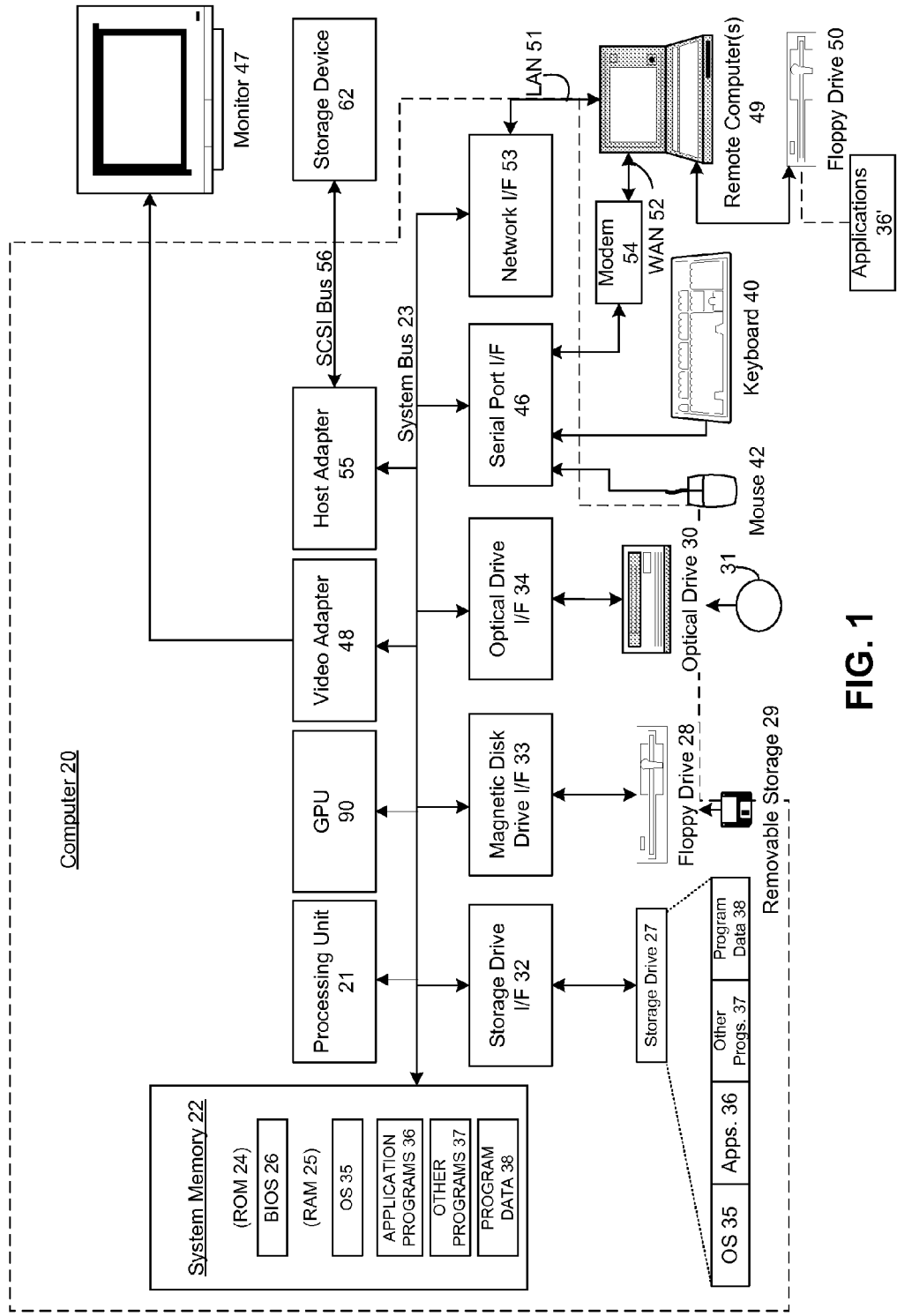
FIG. 1 depicts an example general purpose computing environment in which embodiments of the invention may be implemented.

Embodiments of the invention may execute on one or more computer systems. FIG. 1 and the following discussion are intended to provide a brief general description of a suitable computing environment in which embodiments of the invention may be implemented.

FIG. 1 depicts an example general purpose computing system. The general purpose computing system may include a conventional computer 20 or the like, including processing unit 21. Processing unit 21 may comprise one or more processors, each of which may have one or more processing cores. A multi-core processor, as processors that have more than one processing core are frequently called, comprises multiple processors contained within a single chip package.

Computer 20 may also comprise graphics processing unit (GPU) 90. GPU 90 is a specialized microprocessor optimized to manipulate computer graphics. Processing unit 21 may offload work to GPU 90. GPU 90 may have its own graphics memory, and/or may have access to a portion of system memory 22. As with processing unit 21, GPU 90 may comprise one or more processing units, each having one or more cores.

Computer 20 may also comprise a system memory 22, and a system bus 23 that communicative couples various system components including the system memory 22 to the processing unit 21 when the system is in an operational state. The system memory 22 can include read only memory (ROM) 24 and random access memory (RAM) 25. A basic input/output system 26 (BIOS), containing the basic routines that help to transfer information between elements within the computer 20, such as during start up, is stored in ROM 24. The system bus 23 may be any of several types of bus structures including a memory bus or memory controller, a peripheral bus, or a local bus, which implements any of a variety of bus architectures. Coupled to system bus 23 may be a direct memory access (DMA) controller 80 that is configured to read from and/or write to memory independently of processing unit 21. Additionally, devices connected to system bus 23, such as storage drive I/F 32 or magnetic disk drive I/F 33 may be configured to also read from and/or write to memory independently of processing unit 21, without the use of DMA controller 80.

The computer 20 may further include a storage drive 27 for reading from and writing to a hard disk (not shown) or a solid-state disk (SSD) (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively. The drives and their associated computer-readable storage media provide non-volatile storage of computer readable instructions, data structures, program modules and other data for the computer 20.

Although the example environment described herein employs a hard disk, a removable magnetic disk 29 and a removable optical disk 31, it should be appreciated by those skilled in the art that other types of computer readable media which can store data that is accessible by a computer, such as flash memory cards, digital video discs or digital versatile discs (DVDs), random access memories (RAMs), read only memories (ROMs) and the like may also be used in the example operating environment. Generally, such computer readable storage media can be used in some embodiments to store processor executable instructions embodying aspects of the present disclosure. Computer 20 may also comprise a host adapter 55 that connects to a storage device 62 via a small computer system interface (SCSI) bus 56.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37, and program data 38. Upon execution by the processing unit, the computer-readable instructions cause actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the INTERNET. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

In an embodiment where computer 20 is configured to operate in a networked environment, OS 35 is stored remotely on a network, and computer 20 may netboot this remotely-stored OS rather than booting from a locally-stored OS. In an embodiment, computer 20 comprises a thin client where OS 35 is less than a full OS, but rather a kernel that is configured to handle networking and display output, such as on monitor 47.

Figure 3:
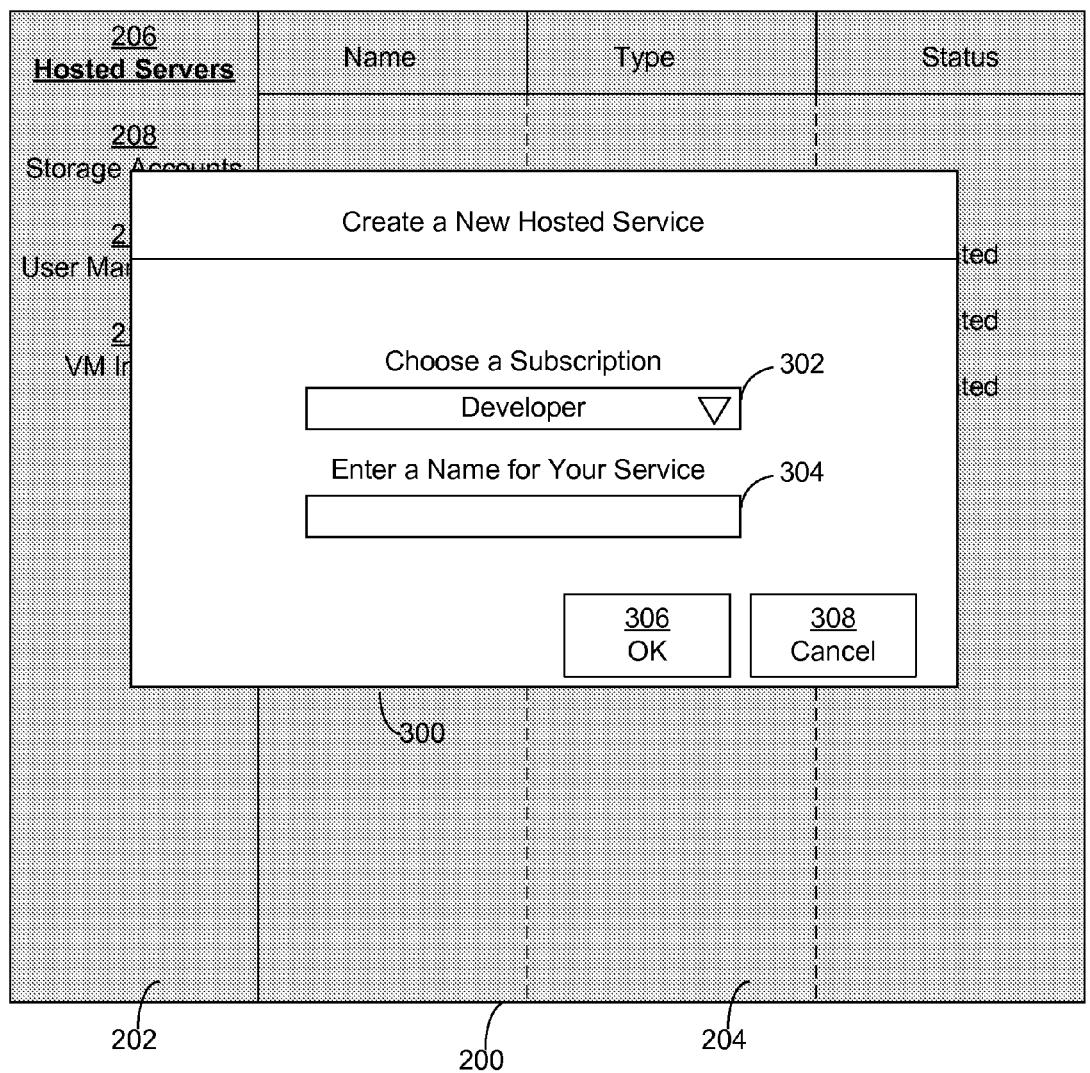
FIG. 3 depicts a second example user interface for an asynchronously refreshing, networked application with a single-threaded user interface for which embodiments of the invention are implemented.

FIG. 2 depicts an example user interface for a single-threaded networked application for which embodiments of the invention are implemented. The user interfaces of FIGS. 2-4 depict user interfaces for an asynchronously refreshing, networked application with a single-threaded user interface that monitors and controls hosted services on a cloud computing platform, such as the MICROSOFT AZURE cloud computing platform. User interface 200 comprises two primary sections—controls 202 and data area 204. Controls 202 provides user interface elements that allow the user to manipulate the application. Data area 204 displays a visualization of the data model of the application, and may be manipulated by user input to controls 202.

As depicted, controls 202 comprises four user interface elements—hosted services 206, storage accounts 208, user management 210, and VM (virtual machine) images 212. A user selecting one of user interface elements 206-212 (such as by clicking one with a mouse) is able to modify the view of the data model of the application. As depicted, hosted services 206 has been selected, and data area 204 depicts a view of the data model corresponding to that selection.

Data area 204 shows a view of the data model that identifies the hosted services. For each hosted service, the name, type and status of the hosted services is identified. For instance, hosted service 214 is identified as having name jdoe1, a type 216 as hosted service, and a status 218 of created.

The data model displayed in data area 204 may be periodically refreshed by the networked application. The refresh is periodic because at least a given period of time expires between two refreshes of the data model (though that period of time may be modified, such as in the case of a failure of a refresh, as described below). There are times when a user will be performing a user-initiated action on user interface 200, after a data model refresh has been initiated, but before the data model has been refreshed. Embodiments of the invention (such as those described with respect to FIG. 7) provide for updating a networked, single-threaded application's data model without blocking the application's entire user interface 200.

FIG. 3 depicts a second example user interface for a single-threaded networked application for which embodiments of the invention are implemented. User interface 300 depicts a dialogue that may be displayed, such as when engaging a user interface element of user interface 200 of FIG. 2 to create a new hosted service. User interface 300 is a modal dialog—a user interface window that requires some form of user action (such as clicking OK 306 or Cancel 308) before the user may resume interacting with the parent user interface—here user interface 200, which is blocked, as depicted by being blocked-out. As depicted, while data area 204 that displays the data model is visible while user interface 300 is visible, no user interface element in user interface 300 is configured to manipulate the data model, so data refreshes of the data model displayed in data area 204 may be paused while user interface 300 is visible.

As depicted, user interface comprises four user-manipulate-able user interface elements—user interface elements 302, 304, 306, and 308. Element 302 permits a user to select a subscription for which a new hosted service will be created (e.g. developer or production). Element 304 permits a user to enter a name for the new hosted service. For instance, the three hosted services depicted in user interface 200 of FIG. 2 are jdoe, jdoe1, and jdoe2. Element 306 permits a user to create the new hosted service indicated by elements 302 and 304 (assuming there is no error involved with the creation), and element 308 permits a user to cancel the creation of a new hosted service and return to user interface 200 of FIG. 2.

FIG. 4 depicts a third example user interface for a single-threaded networked application for which embodiments of the invention are implemented. As with FIG. 3, as depicted in FIG. 4, a data model is not refreshed because the active user interface cannot be modified by any of the available user interface elements. A difference between user interface 300 of FIG. 3, and user interface 400 of FIG. 4 deals with the number of areas in the user interfaces where data of the data model may be displayed. In FIG. 3, there is one area for data of the data model to be displayed—data display area 404. In contrast, in FIG. 4, there are two areas for data of the data model to be displayed—data display areas 404 and 406. Data display area 404 is displaying data of a data model dealing with user management. Data display area 406 is displaying data of a data model dealing with hosted services. The user interface elements in controls 204 are all configured to either manipulate the data in data display area 404, or to navigate to a different part of the application. None of the user interface elements in controls are configured to manipulate the data in data display area 406.

When a periodic refresh of the data model occurs, only data display area 404 will be refreshed. Data display area 404 will be refreshed because there are user interface elements in user interface 400 that are configured to directly manipulate the data in data display area 404. In contrast, data display area 406 will not be refreshed because there are no user interface elements in user interface 400 that are configured to directly manipulate the data in data display area 406—display area 406 is out of scope of all of the available user interface elements. In embodiments, if a refresh of the data model of display area 406 is in process when display area 406 goes out of scope, the current refresh may be allowed to complete before refreshes of the data model of display area 406 is paused (or future refreshes may be paused, though the current refresh is allowed to complete).

The following is pseudo-code in a C-style language syntax that may be used to implement a context-aware periodic refresh of the data model that pauses when it is out of scope. The periodic data refresh mechanism is configured to be able to determine that its data model is being used by active user interface elements. The user interface elements that use a data model are grouped together in "views." An event fires when a view becomes visible or visible. When a view becomes invisible, the periodic refresh pauses. In embodiments, if a refresh is in progress, it is allowed to complete. When a view becomes visible, the timer may be reset to the full refresh period and the refresh mechanism may be resumed:

```
void ViewSwitcher_ViewChanged(object sender,
    ViewChangedEventArgs e)
{
    if (IsVisible( ))
    {
        ResetRefresh( );
        ResumeRefresh(false);
    }
    else
    {
        PauseRefresh(null, null, false);
    }
}
```

Figure 5:
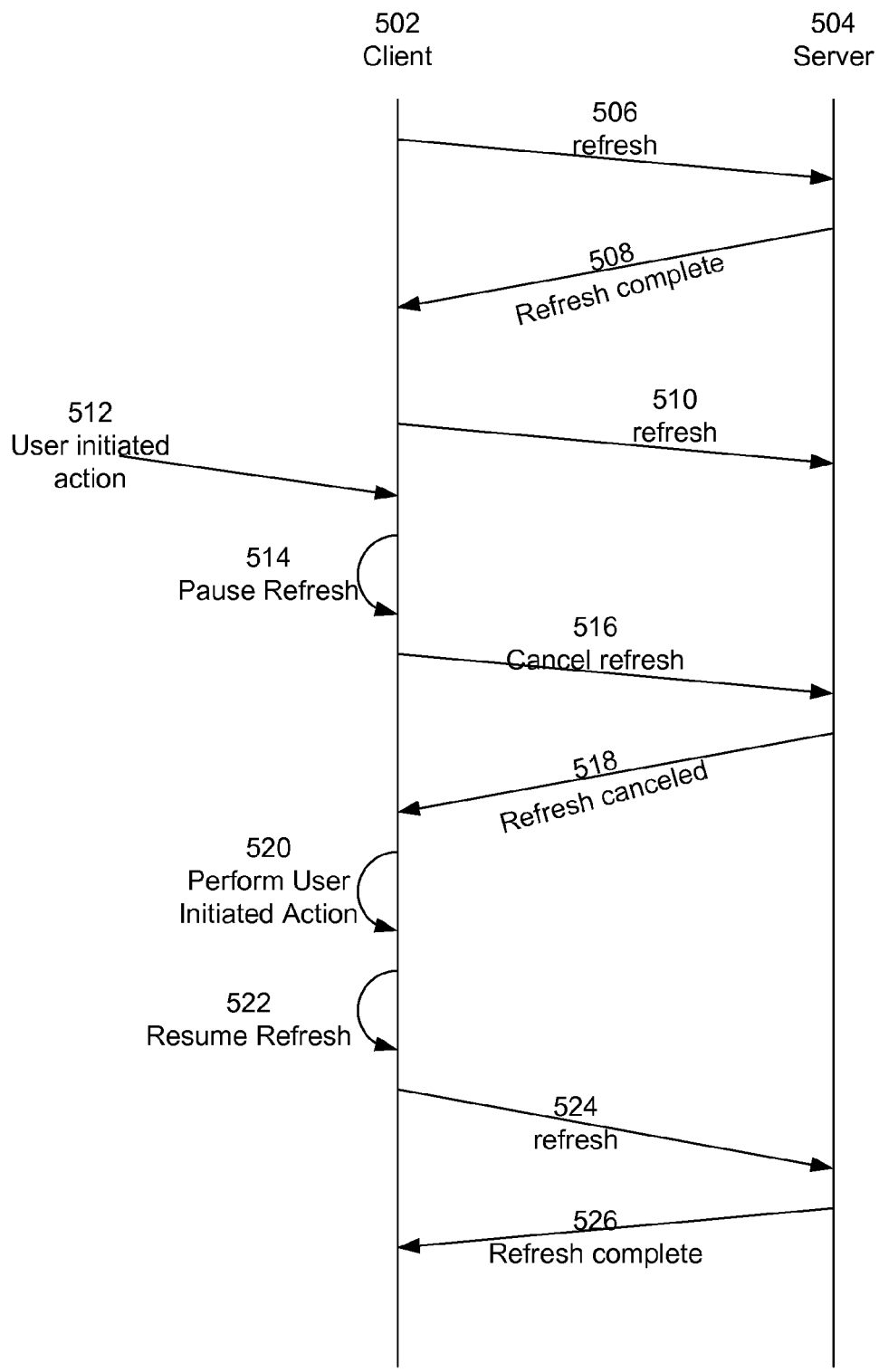
FIG. 5 depicts an example communication flow between a client executing an asynchronously refreshing, networked application with a single-threaded user interface that implements embodiments of the invention, and a server.

FIG. 5 depicts an example communication flow between a client executing a single-threaded networked application that implements embodiments of the invention, and a server. As it executes, client 502 may display user interface 200 of FIG. 2, user interface 300 of FIG. 3, and/or user interface 400 of FIG. 4. Both client 502 and server 504 may be embodied in computer 20 of FIG. 1. Client 502 and server 504 communicate across a communications network, such as the INTERNET. Client 502 executes a single-threaded network application that may have a user interface at various points in time such as user interface 200 of FIG. 2, user interface 300 of FIG. 3, and user interface 400 of FIG. 4.

Broadly, FIG. 5 depicts a message sequence showing a pause-refresh/resume-refresh mechanism. A user-initiated action 512 causes the current refresh to cancel. The user-initiated action itself is blocked until a cancel or refresh is complete. Once the refresh is blocked, the user-initiated action (from message 512) is performed. Upon completion of the user-initiated action, the periodic refresh mechanism is resumed.

It may be appreciated that there are embodiments of the invention that do not implement every message depicted in FIG. 5 (or the other message sequences or operational procedures described herein), or that implement the operational procedures depicted in FIG. 5 (or the other message sequences or operational procedures described herein) in a different order than is depicted. For example, there may be embodiments of the invention where the application does not refresh the data model periodically, but uses some other mechanism to refresh the data model. Such embodiments may not implement message 514 (pausing periodic refreshes of the data model), message 518 (receiving an acknowledgement from server 504 that the refresh was cancelled), or operation 522 (resuming periodic refreshes of the data model). In some embodiments, it may be preferable to implement the invention such that server 504 acknowledges to client 502 that a refresh has been cancelled, such as through message 518.

Client 502 initiates the depicted message sequence by sending server 504 message 506, comprising a request to the server to refresh the client's data model. Server 504 responds by sending client 502 message 508, comprising a refreshed data model. This refresh of the data model depicted by message sequence 506-508 is performed without a user-initiated action occurring during the refresh process.

In contrast, the refresh of the data model depicted by message sequence 510-522 does involve a user-initiated action occurring. In this message sequence, client 502 sends server 504 message 510, comprising a request to refresh the data model. This message 510 may be similar to message 506. Before client 502 receives from server 504 a refreshed data model, client 502 receives message 512, comprising user input indicative of performing an action on the data model.

When client 502 receives this user input 512, client 502 may pause periodic requests to the server to refresh the data model 514. In embodiments, pausing periodic requests to the server to refresh the data model is performed in response to determining that the action involves the use of a critical section, such as a mutating operation on the data model. Client 502 may pause refreshing the data model by taking a callback action as an argument to a computer-executable instruction that implements the pause. When client 502 later resumes refreshes (such as in message 522), that callback action may be invoked.

The following is pseudo-code in a C-style language syntax that may be used to implement pausing refreshes of the data model:

```
public void PauseRefresh(BusyIndicator currentLiveBusyIndicator, Action action, bool cancelRefresh)
{
  IsRefreshPaused = true;
  // define the pause action -
  hide the full screen busy indicator, then call the user initiated action
  Action pauseAction = ( ) =>
  {
    HideFullscreenBusyIndicator( );
    action( );
  };
  if (IsFetchingData( ))
  {
    // cancel the current refresh
    if (cancelRefresh) CancelRefresh( );
    // turn off an existing busy indicator if it is already running
    if (currentLiveBusyIndicator != null)
       currentLiveBusyIndicator.IsBusy = false;
    ShowFullScreenBusyIndicator( );
    EventHandler<DataFetchCompleteEventArgs> handler = null;
    handler = (sender, e) =>
    {
      if (!IsFetchingData( ))
      {
        pauseAction( );
        // ensure handler is removed
        UnregisterFetchDataHandler(handler);
      }
    };
    RegisterFetchDataHandler(handler);
  }
  else
    pauseAction( );
}
```

There may be embodiments of the invention where user input is received for performing another action, but this other action does not involve the use of a critical section—it may not perform a mutating action on the data model. In such embodiments, in response to determining that performing the action does not involve the use of a critical section, embodiments of the invention perform the action without pausing periodic requests to the server to refresh the data model.

In embodiments where the networked application is configured to display an indication while the data model refreshed, and the indication is set to a full-screen block, performing message 514 comprises configuring the network application to display a partial-screen block in response to pausing periodic requests to the server to refresh the data model. A partial-screen block may not disable the engagement of all the user interface elements in the displayed user interface, whereas a full-screen block may disable the engagement of all the user interface elements in the displayed user interface. Where performing message 514 includes configuring the network application to display a partial-screen block, the network application may later be configured to display the full-screen block in response to resuming periodic requests to the server to refresh the data model (such as the resuming of periodic requests performed in message 522).

In addition to performing message 514, client 502 may also send server 504 message 516, comprising a request to cancel the refresh of the data model—the refresh that it requested in message 510. In response to receiving request to cancel the refresh 516, server 504 cancels sending the refresh to client 502, and also sends message 518 to client 502, comprising an indication that the refresh has been cancelled.

When client 502 receives the message indicating that the refresh was cancelled 518, client 502 then performs the action indicated by the user input 520—the action indicated by the user input being indicated by message 512. After client 502 has performed the user-initiated action, client 502 may resume periodic requests to the server to refresh the data model 522. Resuming refreshes 522 undoes the pausing of refreshes that occurred in message 514. The following is in a C-style language syntax that may be used to implement resuming refreshes of the data model:

```
public void ResumeRefresh(bool refreshImmediately)
{
  if (!IsRefreshPaused && refreshImmediately)
     throw new InvalidOperationException( \
     LocalizedStrings.DataRefreshTimer_Error_Text_3);
  IsRefreshPaused = false;
  if (refreshImmediately)
     ForceRefresh( );
}
```

After this refresh that involved a user-initiated action in messages 510-522, additional refreshes that do not involve a user-initiated action may occur in the same manner as the refresh of messages 506-508. For example, request to refresh the client's data model 524 may be performed similar to how message 506 is performed. Likewise, the message for refreshing the data model 526 sent from server 504 to client 502 that comprises an update to the data model may be performed similar to how message 508 is performed, and client may use received message 526 to refresh the data model with the update to the data model.

Figure 6:
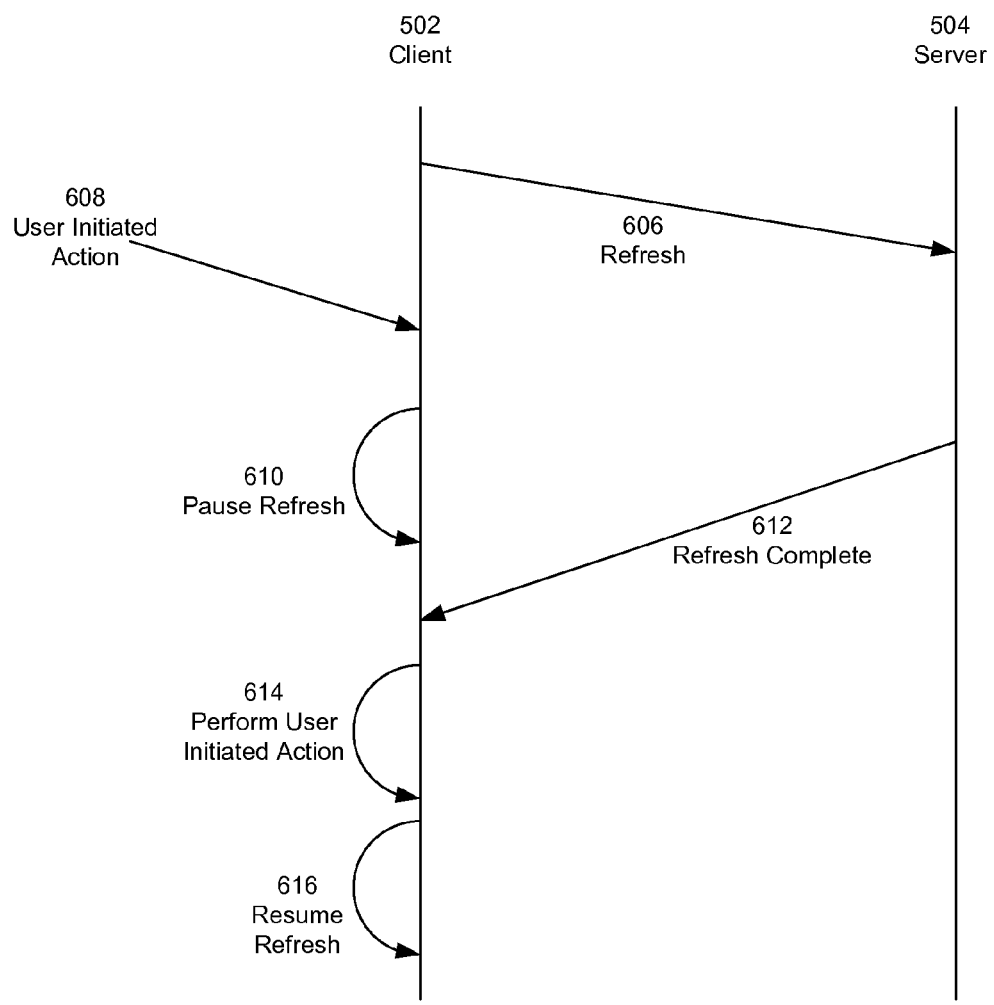
FIG. 6 depicts an example communication flow during an initial data model refresh between a client executing an asynchronously refreshing, networked application with a single-threaded user interface that implements embodiments of the invention, and a server.

FIG. 6 depicts an example communication flow between a client executing a single-threaded networked application that implements embodiments of the invention, and a server. FIG. 6 depicts a scenario where client 502 has recently begun execution and lacks an initial data model. While this data model is initially populated, client 602 receives a user-initiated action. This message flow of FIG. 6 differs from that in FIG. 5, because, in FIG. 6 the user-initiated action is received while the data model is being initially populated, while in FIG. 5, the user-initiated action is received after the data model has been initially populated. A difference between the two scenarios is, when the data model is being initially populated, as in FIG. 6, the user-initiated action is blocked until after the data model has been initially populated (such as through the use of a full-screen block of the user interface, such as described with respect to FIG. 5). In contrast, when the data model as already been initially populated, as in FIG. 5, the user-initiated action causes a subsequent refresh of the data model to be cancelled, so that the user-initiated action may be performed more quickly.

Client 502 sends server 504 message 606, comprising a request to initially populate the data model. Client 502 may already have a data model from a previous session with server 504, in which case message 606 is requesting a true refresh of the data model. In other embodiments, client 502 may have no version of the data model (for instance, because this is client 502's first session with server 504, because client 502 does not locally store the data model between sessions with server 504, or because client 502's copy of the data model became lost or corrupted). After client 502 requests an initial refresh of the data model 606, but before that refresh has been completed, client 502 receives message 608, indicative of receiving user input indicative of performing a second action before receiving from the server data for the data model. In contrast to the user-initiated action of FIG. 5 which gains priority over a refresh, an initial refresh retains priority over a user-initiated action. In response to receiving message 608, client 502 may perform message 610 indicative of pausing periodic requests to the server to refresh the data model, so that data refreshes do not occur while the user-initiated action is performed, after the initial refresh is completed. Performing message 610 may also comprise determining to perform the second action after receiving from the server data for the data model.

Later, server 504 sends client 502 a refreshed data model 612. After receiving from server 502 data for the data model, and once the data model is initially refreshed, client 502 may then perform the user-initiated action—the user-initiated action being indicated by message 608. Having completed the user-initiated action 614, client 616 then performs message 616, comprising resuming periodic requests to the server to refresh the data model. Performing message 616 to resume refreshes may undo performing message 610 to pause refreshes.

Figure 7:
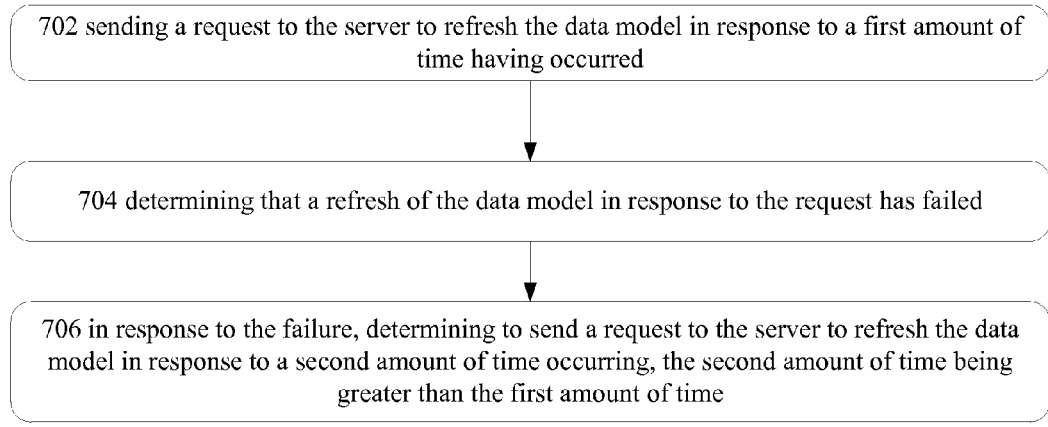
FIG. 7 depicts example operational procedures for refreshing the data model in an asynchronously refreshing, networked application with a single-threaded user interface when a refresh of the data model fails.

FIG. 7 depicts example operational procedures for refreshing the data model in an asynchronously refreshing, networked application with a single-threaded user interface when a refresh of the data model fails. Operation 702 depicts sending a request to the server to refresh the data model in response to a first amount of time having occurred. A first amount of time may have occurred, for instance, through the expiration of a timer set with the first amount of time. The application may check that this first amount of time has occurred, by periodically checking the timer to see whether it has expired or not.

Operation 704 depicts determining that a refresh of the data model in response to the second request has failed. A refresh of the data model may be considered to have failed where a predetermined amount of time has passed between the time that the request for the refresh has been sent and the current time, without the refresh having been received. In embodiments, the server may send the client an indication that a refresh of the data model has failed.

Operation 706 depicts, in response to the failure, determining to send a request to the server to refresh the data model in response to a second amount of time occurring, the second amount of time being greater than the first amount of time. That is, in response to a refresh failure, the period for data refreshes may be extended to a longer amount of time.

The following is pseudo-code in a C-style language syntax that may be used to implement a back-off mechanism in case of failure of refreshing the data model.

```
public void DataRefreshFailure( )
{
  int nextInterval = ++RefreshFailureCount <= _maxRetries ?
    _refreshIntervalMilliseconds :
    _failureRefreshIntervalMilliseconds;
  _nextRefreshTime =
    DateTime.UtcNow.AddMilliseconds(nextInterval);
}
```

The heartbeat—the rate at which checks are made for whether to perform a refresh or not—is decoupled from the refresh period for refreshing the data model. The data refresh is activated when the time since the completion of the most recent refresh is greater than the refresh period. Decoupling the heartbeat from the refresh period allows for easy modification of the refresh period, including a forced refresh, a delayed refresh, and a lengthened period due to the back-off mechanism described with respect to FIG. 7.

The following is pseudo-code in a C-style language syntax that may be used to implement a heartbeat mechanism. The Heartbeat( ) method implements a periodic timer that fires every 500 ms. If the current time exceeds the next refresh time, a refresh happens. The ForceRefresh( ) method resets the next refresh time to the current time. The ResetRefresh( ) method resets the next refresh time to the length of the period.

```
private void Heartbeat(object sender, EventArgs e)
{
  if (!IsRefreshPaused && !IsFetchingData( ) && DateTime.UtcNow >=
    _nextRefreshTime)
  {
    FireDataRefresh(new DataRefreshEventArgs(e));
  }
}
public void ForceRefresh( )
{
  _nextRefreshTime = DateTime.UtcNow;
}
public void ResetRefresh( )
{
  _nextRefreshTime =
    DateTime.UtcNow.AddMilliseconds(_refreshIntervalMilliseconds);
}
```

Figure 8:
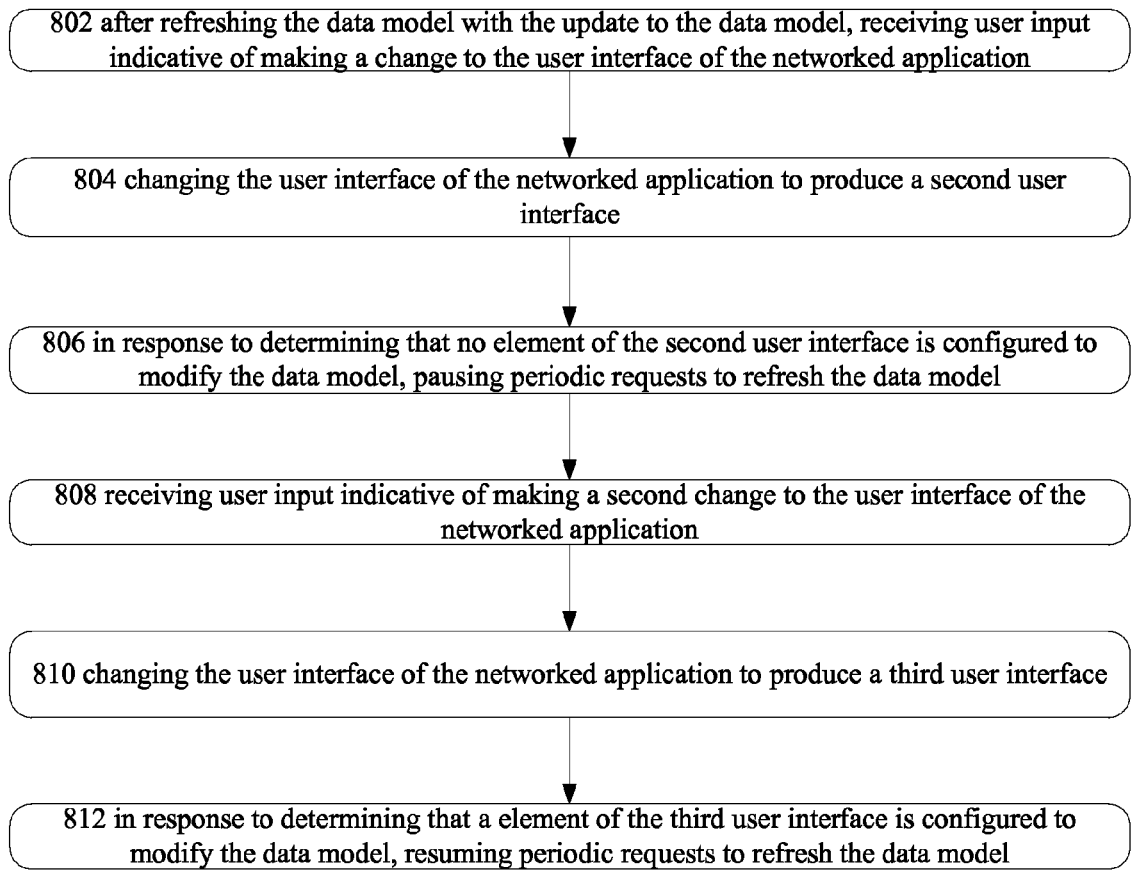
FIG. 8 depicts example operational procedures for pausing the refresh of the data model in an asynchronously refreshing, networked application with a single-threaded user interface when the user interface is modified.

FIG. 8 depicts example operational procedures for pausing the refresh of the data model in an asynchronously refreshing, networked application with a single-threaded user interface when the user interface is modified. Operation 802 depicts, after refreshing the data model with the update to the data model, receiving user input indicative of making a change to the user interface of the networked application. For instance, this may comprise the user performing a mouse click on a user interface element of the user interface to switch the current view to a different view.

Operation 804 depicts changing the user interface of the networked application to produce a second user interface, corresponding to the user input indicative of making the change to the user interface. This may comprise, for instance changing the user interface from user interface 200 of FIG. 2 to user interface 300 of FIG. 3.

Operation 806 depicts, in response to determining that no element of the second user interface is configured to modify the data model, pausing periodic requests to refresh the data model. This may comprise the data model going out of scope, such as is described with respect to FIG. 4.

Operation 808 depicts receiving user input indicative of making a second change to the user interface of the networked application. Operation 808 may be performed in a manner similar to operation 802. Operation 810 depicts changing the user interface of the networked application to produce a third user interface, corresponding to the user input indicative of making the second change to the user interface. This may comprise, for instance, changing the user interface from user interface 300 of FIG. 3 to user interface of FIG. 2.

Operation 812 depicts in response to determining that an element of the third user interface is configured to modify the data model, resuming periodic requests to refresh the data model. This may comprise the data model coming in scope, such as is described with respect to FIG. 4.

While the present invention has been described in connection with the preferred aspects, as illustrated in the various figures, it is understood that other similar aspects may be used or modifications and additions may be made to the described aspects for performing the same function of the present invention without deviating there from. Therefore, the present invention should not be limited to any single aspect, but rather construed in breadth and scope in accordance with the appended claims. For example, the various procedures described herein may be implemented with hardware or software, or a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium. When the program code is loaded into and executed by a machine, such as a computer, the machine becomes an apparatus configured for practicing the disclosed embodiments. In addition to the specific implementations explicitly set forth herein, other aspects and implementations will be apparent to those skilled in the art from consideration of the specification disclosed herein. It is intended that the specification and illustrated implementations be considered as examples only.

What is claimed:

1. A method for updating a data model in an asynchronously refreshing, networked application with a single-threaded user interface, the application being configured to communicate with a computer across a communication network, comprising:

sending, by instructions performed on a single thread of execution of the single-threaded user interface, a first request across the communication network to the computer to refresh the data model;

in response to receiving user input indicative of performing an action on the data model before receiving a refresh of the data model from the computer, sending, by instructions performed on the single thread of execution, a request to the computer to cancel the first request to refresh the data model;

after receiving from the computer an indication that the first request to refresh the data model was cancelled, performing, by instructions performed on the single thread of execution, the action indicated by the user input;

after performing the action indicated by the user input, sending, by instructions performed on the single thread of execution, a second request to the computer to refresh the data model;

in response to receiving from the computer an update to the data model, refreshing, by instructions performed on the single thread of execution, the data model with the update to the data model;

pausing sending of periodic requests to the computer to refresh the data model in response to receiving the user input indicative of performing the action on the data model; and resuming sending of periodic requests to the computer to refresh the data model in response to performing the action indicated by the user input.

2. The method of claim 1, further comprising:

after refreshing the data model with the update to the data model, receiving user input indicative of making a change to the user interface of the networked application;

changing the user interface of the networked application to produce a second user interface, corresponding to the user input indicative of making the change to the user interface; and in response to determining that no element of the second user interface is configured to modify the data model, pausing periodic requests to refresh the data model.

3. The method of claim 2, further comprising:

receiving user input indicative of making a second change to the user interface of the networked application;

changing the user interface of the networked application to produce a third user interface, corresponding to the user input indicative of making the second change to the user interface; and in response to determining that an element of the third user interface is configured to modify the data model, resuming periodic requests to refresh the data model.

4. The method of claim 1, wherein pausing periodic requests to the computer to refresh the data model comprises:

pausing periodic requests to the computer to refresh the data model in response to determining that the action involves the use of a critical section.

5. The method of claim 4, further comprising:

receiving user input of performing a second action; and in response to determining that performing the second action does not involve the use of a critical section, performing the second action without pausing periodic requests to the computer to refresh the data model.

6. The method of claim 1, wherein the networked application is configured to display an indication while the data model refreshed, the indication being set to a full-screen block, and further comprising:

configuring the networked application to display a partial-screen block in response to pausing periodic requests to the computer to refresh the data model; and configuring the networked application to display the full-screen block in response to resuming periodic requests to the computer to refresh the data model.

7. The method of claim 1, further comprising:

sending a request to the computer to initially populate the data model;

displaying a full-screen block on the single-threaded user interface while initially populating the data model;

receiving user input indicative of performing a second action before receiving from the computer data for the data model;

determining to perform the second action after receiving from the computer data for the data model; and after receiving from the computer data for the data model, performing the second action.

8. The method of claim 7, wherein requests to the computer to refresh the data model are sent periodically, and further comprising:

pausing periodic requests to the computer to refresh the data model in response to receiving the user input indicative of performing the second action on the data model; and resuming periodic requests to the computer to refresh the data model in response to performing the second action indicated by the user input.

9. The method of claim 1, further comprising:

sending a request to the computer to initially populate the data model; and populating the data model in response to receiving from the computer data for the data model, before sending the request to the computer to refresh the data model.

10. The method of claim 1, further comprising:

sending a second request to the computer to refresh the data model in response to a first amount of time having occurred;

determining that a refresh of the data model in response to the second request has failed; and in response to the failure, determining to send a third request to the computer to refresh the data model in response to a second amount of time occurring, the second amount of time being greater than the first amount of time.

11. A system for updating a data model in an asynchronously refreshing, networked application with a single-threaded user interface, the application being configured to communicate with a computer across a communications network, comprising:

a processor; and a memory communicatively coupled to the processor when the system is operational, the memory bearing processor-executable instructions that, when executed by the processor on a single thread of execution of the single-threaded user interface, cause the system at least to:

send a request to the computer to refresh the data model;

in response to receiving user input indicative of performing an action on the data model before receiving a refresh of the data model from the computer, send a request to the computer to cancel the request to refresh the data model;

perform the action indicated by the user input subsequent to sending the request to the computer to cancel the request to refresh the data model;

send a second request to the computer to refresh the data model subsequent to performing the action indicated by the user input; and in response to receiving from the computer an update to the data model, refresh the data model with the update to the data model;

pause periodic requests to the computer to refresh the data model in response to receiving the user input indicative of performing the action on the data model; and resume periodic requests to the computer to refresh the data model in response to performing the action indicated by the user input.

12. The system of claim 11, wherein the memory further bears processor-executable instructions that, when executed on the processor, cause the system at least to:

after refreshing the data model with the update to the data model, receive user input indicative of making a change to the user interface of the networked application;

change the user interface of the networked application to produce a second user interface, corresponding to the user input indicative of making the change to the user interface; and in response to determining that no element of the second user interface is configured to modify the data model, pause periodic requests to refresh the data model.

13. The system of claim 12, wherein the memory further bears processor-executable instructions that, when executed on the processor, cause the system at least to:

receive user input indicative of making a second change to the user interface of the networked application;

change the user interface of the networked application to produce a third user interface, corresponding to the user input indicative of making the second change to the user interface; and in response to determining that a element of the third user interface is configured to modify the data model, resume periodic requests to refresh the data model.

14. The system of claim 13, wherein the processor-executable instructions that, when executed on the processor, cause the system to at least pause periodic requests to the computer to refresh the data model further cause the system at least to:

pausing periodic requests to the computer to refresh the data model in response to determining that the action involves the use of a critical section.

15. The system of claim 14, wherein the memory further bears processor-executable instructions that, when executed on the processor, cause the system at least to:

receive user input of performing a second action; and in response to determining that performing the second action does not involve the use of a critical section, perform the second action without pausing periodic requests to the computer to refresh the data model.

16. The system of claim 11, wherein the networked application is configured to display an indication while the data model refreshed, the indication being set to a full-screen block, and wherein the memory further bears processor-executable instructions that, when executed on the processor, cause the system at least to:

configure the network application to display a partial-screen block in response to pausing periodic requests to the computer to refresh the data model; and configure the network application to display the full-screen block in response to resuming periodic requests to the computer to refresh the data model.

17. The system of claim 11, wherein the memory further bears processor-executable instructions that, when executed on the processor, cause the system at least to:

send a request to the computer to initially populate the data model;

receive user input indicative of performing a second action before receiving from the computer data for the data model;

determine to perform the second action after receiving from the computer data for the data model; and after receiving from the computer data for the data model, perform the second action.

18. A computer-readable storage device for updating a data model in an asynchronously refreshing, networked application with a single-threaded user interface, the application being configured to communicate with a server across a communications network, bearing computer-readable instructions that, when executed by a computer cause the computer to perform operations comprising:

sending, by a user-interface thread of the single-threaded user interface, a first request to the server to refresh the data model;

in response to receiving user input indicative of performing an action on the data model before receiving a refresh of the data model from the server, sending, by the user-interface thread, an additional request to the server to cancel the request to refresh the data model;

after receiving from the server an indication that the request to refresh the data model was cancelled, performing, by the user-interface thread, the action indicated by the user input;

after performing the action indicated by the user input, sending, by the user-interface thread, a second request to the server to refresh the data model;

in response to receiving from the server an update to the data model, refreshing, by the user-interface thread, the data model with the update to the data model;

pausing sending of periodic requests to the computer to refresh the data model in response to receiving the user input indicative of performing the action on the data model; and resuming sending of periodic requests to the computer to refresh the data model in response to performing the action indicated by the user input.

19. The computer-readable storage device of claim 18, further bearing computer-readable instructions that, when executed by the computer cause the computer to perform operations comprising:

after refreshing the data model with the update to the data model, receiving user input indicative of making a change to the user interface of the networked application;

changing the user interface of the networked application to produce a second user interface, corresponding to the user input indicative of making the change to the user interface; and in response to determining that no element of the second user interface is configured to modify the data model, pausing periodic requests to refresh the data model.

20. The computer-readable storage device of claim 18, further bearing computer-readable instructions that, when executed by the computer cause the computer to perform operations comprising:

receiving user input indicative of making a second change to the user interface of the networked application;

changing the user interface of the networked application to produce a third user interface, corresponding to the user input indicative of making the second change to the user interface; and in response to determining that an element of the third user interface is configured to modify the data model, resuming periodic requests to refresh the data model.

\* \* \* \* \*